United States Patent [19]

Hall et al.

[11] 4,178,327

[45] Dec. 11, 1979

[54] AR-HALO-AR(T-ALKYL)STYRENES AND POLYMERS THEREOF

[75] Inventors: Richard H. Hall, Midland; Daniel H. Haigh, Sanford; Junior J. Lamson, Bay City; Larry D. Yats, Clare, all of Mich.

[73] Assignee: The Dow Chemical Company, Midland, Mich.

[21] Appl. No.: 822,129

[22] Filed: Aug. 5, 1977

Related U.S. Application Data

[60] Division of Ser. No. 696,599, Jun. 16, 1976, Pat. No. 4,054,733, which is a continuation-in-part of Ser. No. 534,391, Dec. 19, 1974, abandoned, which is a division of Ser. No. 94,578, Dec. 2, 1970, abandoned.

[51] Int. Cl.$^2$ .................. C08F 4/32; C08F 267/06; C08F 12/16
[52] U.S. Cl. .................. 525/169; 260/40 R; 260/DIG. 24; 526/227; 526/228; 526/271; 526/293
[58] Field of Search ............ 260/2.5 FP, 862, 880, 260/DIG. 24, 45.7 RL, 649 R, 649 F; 526/293

[56] References Cited

U.S. PATENT DOCUMENTS

| | | | |
|---|---|---|---|
| 3,058,926 | 10/1962 | Eichhorn | 260/DIG. 24 |
| 3,058,928 | 10/1962 | Eichhorn et al. | 260/DIG. 24 |
| 3,093,599 | 6/1963 | Mueller-Tamm et al. | 260/DIG. 24 |
| 3,333,025 | 7/1967 | Bader et al. | 260/880 R |
| 3,338,864 | 8/1967 | Mageli et al. | 260/2.5 FR |
| 3,435,011 | 3/1969 | Uraneck et al. | 260/880 R |
| 3,455,873 | 7/1969 | Jenkner | 260/2.5 FP |
| 3,457,204 | 7/1969 | Burger et al. | 260/880 |
| 3,470,116 | 9/1969 | Praetzel et al. | 260/862 |
| 3,534,012 | 10/1970 | Dennis | 526/293 |
| 3,732,321 | 5/1973 | Raley | 260/649 F |
| 3,830,889 | 8/1974 | Peets et al. | 260/880 R |
| 3,864,427 | 2/1975 | Nakane et al. | 260/862 |
| 3,912,792 | 10/1975 | Touval | 260/880 R |
| 3,920,606 | 11/1975 | Diebel et al. | 260/880 R |
| 3,933,666 | 1/1976 | Yoneno et al. | 260/880 R |
| 4,056,508 | 11/1977 | Schmidt et al. | 260/45.7 RL |

FOREIGN PATENT DOCUMENTS

887693 12/1971 Canada .................. 260/862

*Primary Examiner*—Herbert J. Lilling
*Attorney, Agent, or Firm*—Michael S. Jenkins

[57] ABSTRACT

Ar-halo-ar(t-alkyl)styrenes, e.g., 2-chloro-4-(t-butyl)styrene, polymerize to form materials having unusually high temperature resistance. Additionally, compositions of such monomers, unsaturated polyesters and free-radical generating catalysts cure at lower temperatures and in less time than similar compositions containing conventional styrene monomers.

9 Claims, No Drawings

AR-HALO-AR(T-ALKYL)STYRENES AND POLYMERS THEREOF

CROSS REFERENCE TO RELATED APPLICATIONS

This is a division of application Ser. No. 696,599, filed June 16, 1976, now U.S. Pat. No. 4,054,733, which in turn is a continuation-in-part of application Ser. No. 534,391, filed Dec. 19, 1974, now abandoned, which in turn is a division of application Ser. No. 94,578, filed Dec. 2, 1970, now abandoned.

BACKGROUND OF THE INVENTION

This invention relates to ar-halo-ar-alkylstyrene monomers, polymers and curable molding compositions containing such monomers.

Polymers of styrene and various ring substituted styrenes are known to be useful in molding applications and the like. In many molding and similar applications, however, the conventional styrene polymers do not possess enough heat resistance and/or the ability to be cured rapidly.

Also it is known to prepare curable molding compositions of crosslinkable polymers, e.g., unsaturated polyesters, and styrene monomers. In curing such compositions with the use of free-radical generating catalysts, e.g., t-butyl perbenzoate, t-butylperoctoate, dicumyl peroxide and the like, and heat, it is greatly desirable to effect complete curing within a relatively short period of time at minimum temperature. In many applications, it is also desirable that the resulting cured compositions exhibit resistance to high temperatures and at least a minimum degree of flame resistance.

While styrene and many known substituted styrene monomers impart desirable qualities to the cured compound such as stiffness, the time required to gel such curable compositions and the temperature increase during curing are often excessive and therefore uneconomical. Additionally, exposure to the relatively high temperatures during curing often has a deleterious effect on the cured product, e.g., the existence of thermal stresses in the polymers of the cured product when such polymers are cooled to use temperatures. Such high temperatures during curing necessitate the employment of massive pressure equipment in order to make good moldings.

In view of the foregoing disadvantages of conventional styrene polymers and of curable compositions employing styrene or conventional styrene monomers, it would be highly desirable to provide monomers (1) which polymerize to heat resistant materials and (2) which, when substituted for styrene in conventional curable compositions, enable the compositions to gel in shorter times and to cure at lower temperatures. Such monomers would offer the great commercial advantage of enabling the use of fast mechanical presses employing essentially contact pressures instead of slow hydraulic presses.

SUMMARY OF THE INVENTION

In accordance with this invention, there are provided novel ar-halo-ar-(t-alkyl)styrene monomers which polymerize to form materials having high heat resistance. Curable compositions of these monomers with crosslinkable polymers and free radical generating catalysts gel in less time and cure at lower temperatures than do conventional compositions containing styrene.

The novel styrene monomers of the present invention are represented by the general structural formula:

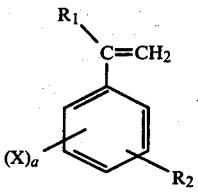

wherein $R_1$ is hydrogen or alkyl having 1 to 2 carbon atoms; $R_2$ is a tertiary alkyl having from 4 to 8 carbon atoms and is in a ring position para or meta to the ethylenic

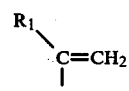

group; X is chloro, bromo or fluoro and is in an open ring position; and a is one or two. By "open ring position" is meant a ring position which is not occupied by either the ethylenic group or $R_2$ and which is not sterically hindered by either or both of said groups.

The ar-halo-ar-(t-alkyl)styrenes, particularly the ar-halo-ar-(t-butyl)styrenes, are surprisingly more stable when exposed to heat than are the ar-halo-ar-(n-alkyl)styrenes. As a result of this surprising thermal stability, the monomers of this invention when polymerized do not contain significant amounts of crosslinked polymer, often called gels. The absence of such gels in structural polymers of this type is important to render them useful in many applications, e.g., moldings, foams, films, coatings and similar articles, wherein the presence of gels considerably weaken the article and/or deleteriously effects its appearance. Needless to say, the presence of gels in such polymeric materials renders them much more difficult, if not impossible, to extrude or mold. In addition, the tendency of monomers to form gels under normal polymerization conditions causes problems in the polymerization process, e.g., buildup of hydrocarbon-insoluble product in the polymerization reactor which leads to frequent shut-down of the process to clean the reactor.

As stated hereinbefore, the ar-halo-ar-(t-alkyl)styrenes, particularly the ar-bromo-ar-(t-alkyl)styrenes, when polymerized exhibit surprisingly higher heat resistance (higher melting points) and reduced burning characteristics than do the polymers of ar-(t-alkyl)styrenes. As a result of such higher heat resistances, such polymers can be foamed at higher temperatures at which water can be effectively employed as a blowing agent.

Curable compositions effectively employing the foregoing novel monomers comprise a crosslinkable material, ar-halo-ar-(t-alkyl)styrene monomer and preferably a free-radical generating catalyst. Such curable compositions are particularly useful in the production of large molded articles such as auto bodies, aircraft parts, truck and bus bodies and parts, construction materials and the like. These compositions are particularly useful in the production of thick parts wherein cure exotherm can be damaging during rapid cure. The low shrinkage of the novel monomers during polymerization also enhances the properties of the cured compositions as compared to known monomers.

Polymers of the novel monomers of this invention are useful in the production of shaped articles requiring high heat resistance such as electrical motor and appliance housings, contact pressure moldings, plastic parts to be painted and then oven cured, automobile hoods, hulls for deep sea vessels, structural panels and beams as well as foams, architectural applications, films, large complex unimoldings and laminates for electrical and electronic appliances, glass fiber-reinforced articles, and the like.

DESCRIPTION OF THE PREFERRED EMBODIMENTS

Preferred ar-halo-ar-(t-alkyl)styrene monomers of this invention are represented by the following structural formulas:

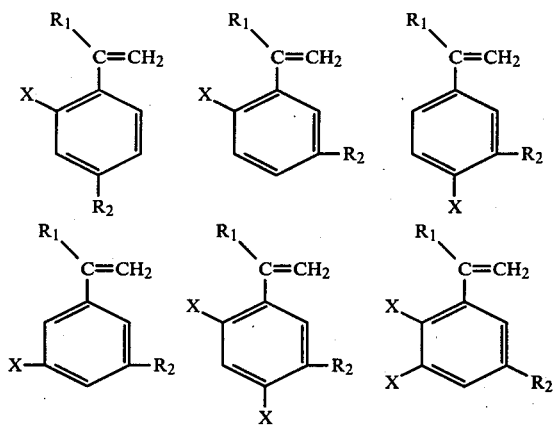

wherein $R_1$ is hydrogen, methyl, or ethyl; $R_2$ is tertiary alkyl having from 4 to 8 carbon atoms, perferably tertiary butyl, and X is fluoro, chloro or bromo, preferably chloro or bromo.

Exemplary tertiary alkyl groups include t-butyl; t-pentyl; tertiary hexyl groups (hereinafter called t-hexyl), i.e., tertiary alkyl groups having 6 carbon atoms such as 3-methylpent-3-yl, 2-methylpent-2-yl and 2,3-dimethylbut-2-yl; tertiary heptyl groups, (hereinafter called t-heptyl), i.e., tertiary alkyl groups having 7 carbon atoms, such as 3-methylhex-3-yl, 2-methylhex-2-yl, 2,3,3-trimethylbut-2-yl, and 2,3-dimethylpent-2-yl, 2,4-dimethylpent-2-yl and 2,3-dimethylpent-3-yl; and tertiary octyl groups (hereinafter called t-octyl), i.e., tertiary alkyl groups having 8 carbon atoms, such as 2-methylhept-2-yl, 3-methylhept-3-yl, 4-methylhept-4-yl, 2,3,3-trimethylpent-2-yl, 2,4,4-trimethylpent-2-yl, 2,3,4-trimethylpent-2-yl, 2,3,4-trimethylpent-3-yl, 2,2,3-trimethylpent-3-yl, 2,3-dimethylhex-2-yl, 2,4-dimethylhex-2-yl, 2,5-dimethylhex-2-yl, 2,3-dimethylhex-3-yl, 3,4-dimethylhex-3-yl, 3,5-dimethylhex-3-yl, 2-methyl-3-ethylpent-3-yl, and 2-methyl-3-ethylpent-2-yl.

Examples of preferred ar-halo-ar-alkylstyrenes are 2-chloro-4-(t-butyl)styrene, 2-bromo-4-(t-butyl)styrene, 2-chloro-4-(t-pentyl)styrene, 2-bromo-4-(t-pentyl)styrene, 2-chloro-4-(t-hexyl)styrene, 2-bromo-4-(t-heptyl)styrene, 2-chloro-4-(t-octyl)styrene, 2-chloro-5-(t-butyl)styrene, 2-bromo-5-(t-butyl)styrene, 2-chloro-5-(t-pentyl)styrene, 2-bromo-5-(t-pentyl)styrene, 2-chloro-5-(t-hexyl)styrene, 2-bromo-5-(t-heptyl)styrene, 2-chloro-5-(t-octyl)styrene, 4-chloro-3-(t-butyl)styrene, 3-chloro-5-(t-butyl)styrene, 3-bromo-5-(t-butyl)styrene, 3-chloro-5-(t-pentyl)styrene, 3-bromo-5-(t-hexyl)styrene, 3-chloro-5-(t-octyl)styrene, 3-bromo-5-(t-heptyl)styrene, 2,3-dichloro-5-(t-butyl)styrene, 2,3-dichloro-5-(t-pentyl)styrene, 2,3-dibromo-5-(t-butyl)styrene, 2,3-dichloro-5-(t-pentyl)styrene, and the like.

Examples of suitable ar-halo-ar-(t-alkyl)styrenes contemplated in the practice of this invention are 2-fluoro-4-(t-butyl)styrene, 2-fluoro-5-(t-pentyl)styrene, and similar ar-halo-ar-(t-alkyl)styrenes. Also included are 2-chloro-4-(t-butyl)-α-methylstyrene, 2-bromo-4-(t-butyl)-α-ethylstyrene, 2-bromo-5-(t-pentyl)-α-methylstyrene and other ar-halo-ar-(t-alkyl)-α-methyl- and -α-ethylstyrenes.

The foregoing styrene monomers can be made by many different techniques, and this invention includes the foregoing monomers made by any method.

Generally, however, preparation of the foregoing monomers wherein halogen is bromo or chloro is advantageously carried out in the following steps:

(1) alkylating ethyl benzene with suitable olefin, e.g., isobutylene, or suitable t-alkyl halide, e.g., t-butyl chloride, t-amyl chloride, etc.;

(2) halogenating the aromatic ring of the resulting ar-alkylethylbenzene with free halogen or similar halogenating agent;

(3) oxidizing the resulting ar-halo-ar-alkyl ethylbenzene to the corresponding ar-halo-ar-alkyl acetophenone;

(4) reducing the acetophenone to the corresponding alcohol; and (5) dehydrating the alcohol to form the desired styrene monomer, sometimes a mixture of two or more ar-halo-ar-alkyl styrene monomers.

In the preparation of monomers wherein halogen is fluoro, the aromatic ring is fluorinated by replacing ring-substituted bromo or chloro with fluoro using a fluoride salt such as potassium fluoride. To prepare monomers wherein $R_1$ is alkyl, an acetophenone having the desired substituents is reacted with alkyl magnesium bromide to form the alcohol which can be dehydrated to the desired α-alkylstyrene.

The desired styrene monomer can be isolated by known techniques and employed in essentially pure form or the isomeric mixture of such monomers can be employed with nearly the same results. The foregoing steps of alkylation and halogenation of aromatic rings are well known as are the conditions of such reactions which will yield substantial amounts of any one of the aforementioned monomers.

Illustratively, ar-halo-ar-(t-alkyl)styrenes, particularly the 2-halo-ar-(t-alkyl)styrenes wherein halo is chloro or bromo, are prepared by the stepwise manner of (1) alkylating ethyl benzene with a suitable olefin, e.g., isobutylene, in the presence of sulfuric acid in accordance with the method of Ipatieff et al., JACS, Vol 58, 919 (1936);

(2) halogenating the aromatic ring of the resulting ar-(t-alkyl)ethylbenzene with free halogen in the presence of Lewis Acid such as tin tetrachloride;

(3) oxidizing the resulting ar-halo-ar-(t-alkyl)ethylbenzene to a mixture of the corresponding acetophenone-alcohol by the method of H. J. Sanders et al., Ind. and Eng. Chem., Vol 45, 2 (1953);

(4) reducing the mixture by catalytic hydrogenation to the corresponding alcohol; and (5) dehydrating the alcohol with a dehydration catalyst, such as silica gel, alumina or titania, to form ar-halo-ar-(t-alkyl)styrene. In cases wherein halo is fluoro, the ar-chloro-ar-(t-alkyl)ethylbenzene is reacted with potassium fluoride in accordance with the method of Finger et al., *JACS*, Vol 78, 6034 (1956). In cases wherein alkyl is primary or secondary, acylation is carried out in the manner described in *Organic Syntheses*, Collective Vol 2, 3–5 (1943).

Ar-halo-ar-(t-alkyl)styrenes of this invention polymerize readily under conditions conventionally employed for polymerizing styrene. For example, the foregoing styrene monomers polymerize when subjected to conditions of conventional free-radical catalyzed mass, suspension- and emulsion-polymerization techniques and of conventional ionic polymerization techniques.

Representative catalysts employed in free-radical catalyzed polymerizations include azo and peroxide-types, e.g., peroxides such as benzoyl peroxide, hydroperoxides such as t-butyl hydroperoxide, per-acids such as perbenzoic acid, peresters such as t-butyl peroctoate and azo compounds such as azobisisobutyronitrile, with oil soluble catalysts such as benzoyl peroxide and dicumyl peroxide being employed in suspension and mass polymerization and water soluble peroxides such as potassium persulfate and known redox-catalytic systems such as cumene hydroperoxide, urea-polyformaldehyde and ferric trichloride being employed in emulsion polymerization. Free radical catalyzed polymerization is readily effected at temperatures of from about room temperature to about 200° C. under atmospheric to superatmospheric pressure at catalyst concentrations of 0 in the case of thermal initiation to about 5 weight percent based on weight of monomers, preferably from about 0.01 to about 5 weight percent of catalyst in pure form or in an inert solvent for the catalyst. Thermal initiation generally occurs at temperatures between 60°–120° C.

Representative ionic catalysts include lithium based catalysts, e.g., metallic lithium, alkyl lithium and other lithium compounds, and Ziegler catalysts, e.g., reducible halide of titanium or vanadium in combination with aluminum trialkyl, or diethylaluminum chloride, or lithium aluminum hydride. Ionic polymerization is advantageously carried out in an inert hydrocarbon solvent such as lower alkane or lower aromatic hydrocarbon at temperatures in the order of about −20° to about 140° C. under pressures ranging from atmospheric to superatmospheric and in the presence of from about 1 to 200 ppm of ionic catalyst based on weight of monomers. Polymerization is similarly effected by cationic catalysis at temperatures from −100° to 100° C. in the presence of the etherates of boron trifluoride and aluminum trichloride or in the presence of Ziegler catalysts such as the reaction product of reducible transition metal compounds such as titanium tetrachloride or trichloride and reducing organo metallic compounds such as triethyl aluminum or diethylaluminum chloride.

Under one or more of the aforementioned polymerization techniques, the ar-halo-ar-(t-alkyl)styrenes of the present invention are copolymerized with one or more of the following monomers: other ar-halo-ar-(t-alkyl)styrenes as described hereinbefore; the monovinylidene carbocyclic aromatic monomers such as styrene, α-methylstyrene, ar-t-butylstyrene, ar-chlorostyrene, ar-bromostyrene, ar,ar-dichlorostyrene, ar,ar-dibromostyrene, ar-methylstyrene, ar,ar-dimethylstyrene, ar-methoxystyrene, vinylbenzyl chloride, ar-isopropylstyrene, ar-ethylstyrene, divinylbenzene, ar,ar-diisopropenylbenzene and ar-vinyl-ar-isopropenylbenzene; the conjugated aliphatic dienes such as butadiene, isoprene, 2,3-dimethylbutadiene, and cyclopentadiene, the α-monoolefins and halogenated α-monoolefins such as ethylene, propylene, butene-1, isobutylene, 2-methyl pentene-1, vinylidene chloride; the lower alkyl or hydroxyalkyl esters of α,β-ethylenically unsaturated mono- and di-carboxylic acids such as ethyl acrylate, methyl methacrylate, n-propyl itaconate, diethyl maleate, dimethyl fumarate, n-butyl hydrogen maleate, n-pentyl ethacrylate, n-octyl acrylate, iso-butyl acrylate, 2-hydroxyethyl acrylate, n-dodecyl methacrylate and other esters wherein alkyl has from 1 to 24 carbon atoms and hydroxyalkyl has from 1 to 12 carbon atoms; other polymerizable esters such as methyl ar-vinyl-benzoate and ethyl ar-vinyl-benzoate, the α,β-monoethylenically unsaturated nitriles and amides such as acrylonitrile, methacrylonitrile, ethacrylonitrile, fumaronitrile, acrylamide, methacrylamide, and fumaramide; other polymerizable amides and nitriles such as ar-cyanostyrene and vinylbenzamide; the α,β-ethylenically unsaturated mono- and di-carboxylic acids such as acrylic acid, methacrylic acid, maleic acid and anhydride, fumaric acid, itaconic acid, and citraconic acid; other ethylenically unsaturated carboxylic acids such as vinylbenzoic acid.

Homopolymers and copolymers of the ar-halo-ar-(t-alkyl)styrenes are normally solid, thermoplastic materials having heat distortion temperatures generally higher than corresponding homopolymers and copolymers of styrene or other previously known monovinylidene carbocyclic aromatic monomers. As a general rule the polymers of ar-halo-ar-(t-alkyl)styrenes can be molded, extruded, milled or otherwise fabricated into useful articles according to known techniques for fabricating conventional styrene polymers with the exception that somewhat higher temperatures must be employed.

The improved curable compositions of the present invention comprise a crosslinkable material, an ar-halo-ar-(t-alkyl)styrene as described hereinbefore and preferably a catalytic amount of a free-radical generating catalyst. By crosslinkable material is meant a monomer or polymer containing at least one ethylenically unsaturated bond which is polymerizable with a vinylidene aromatic carbocyclic monomer such as styrene. Preferably said compositions comprise from about 5 to about 70 weight percent of the crosslinkable material, from about 95 to about 30 weight percent of the ar-halo-ar-(t-alkyl)styrene and the catalyst. Usually the concentration of catalyst is from about 0.1 to about 4 weight percent based on monomer.

In the improved curable compositions of this invention, the crosslinkable materials employed therein are preferably crosslinkable polymers such as the unsaturated polyesters.

For the purposes of this invention, the term "unsaturated polyesters" is meant to include condensation reaction products of saturated or unsaturated polycarboxylic acids with polyhydric alcohols.

Exemplary polycarboxylic acids include the unsaturated dicarboxylic acids such as maleic, fumaric, itaconic, mesaconic, and citraconic and other polycarboxylic acids or anhydrides such as adipic, succinic, phthalic, isophthalic, terephthalic, diglycolic, oxalic, sebacic, azaleic, maleic, glutaric, diphenic, tetrachlorophthalic, 2,3-dicarboxy-1,4,5,6,7,7-hexachlorobicyclo[2.2.1]hept-5-ene anhydride, 2,3-dicarboxy-5,8-endomethylene-5,6,7,8,9,9-hexachloro-1,2,3,4,4a,5,8,8a-octahydronaphthalene anhydride and the like.

Among the polyhydric alcohols suitably employed are the diols such as ethylene glycol, propylene glycol, diethylene glycol, dipropylene glycol, triethylene glycol, neopentyl glycol, propane-, butane-, pentane- and hexane-diols, trimethylene glycol, polyethylene glycol, polypropylene glycol, dimethylolpropane, also included are bisphenol-A, and hydrogenated bisphenol-A. Monofunctional alcohols, such as butanol, tetrahydrofurfuryl alcohol and ethylene glycol monobutyl ether, as well as monobasic acids, such as benzoic, t-butylbenzoic, oleic, linseed oil fatty acid and dehydrated castor oil fatty acid may also be employed. Suitable crosslinkable polymers also include diene polymers, particularly elastomeric polymers of conjugated aliphatic dienes having pendant vinyl groups on the polymer chain such as 1,2-polybutadiene, polyisoprenes and block copolymers of polymerized styrene and polymerized conjugated dienes having pendant vinyl groups. Also included in the crosslinkable materials are polyethylenic monomers such as divinyl benzene, trivinyl benzene, diisopropenyl benzene, vinylisopropenyl benzene, divinyl toluene and the like.

Polymerization or gel catalysts useful for curing the improved curable compositions of this invention are conventional free-radical generating catalysts such as peroxides, e.g., dicumyl peroxide, di-t-butyl peroxide, t-butyl perbenzoate, t-butyl peroctoate, 2,2-bis-(t-butylperoxy)butane, benzoyl peroxide, lauroyl peroxide, and methyl ethyl ketone peroxide; azo compounds such as azobisisobutyronitrile, and the like. Promoters may be used such as cobalt, manganese, iron, nickel, zirconium and the like in the form of octoates, naphthenates, or acetylacetonates which are compatible with the monomeric material. Accelerators such as N,N'-dimethylaniline are optionally employed to shorten the total cure time for the aforementioned curable compositions. It is understood, however, that neither the catalyst nor the accelerator are required as the curable compositions are readily cured by thermal initiation using temperatures from about 30° to about 120° C.

In addition to crosslinkable polymer, ar-halo-ar-(t-alkyl)styrene, and catalysts, the curable compositions may also contain other monomers copolymerizable with the styrene as such copolymerizable monomers are set forth hereinbefore. Exemplary copolymerizable monomers include styrene, divinyl benzene, vinyl toluene, ar-(t-butyl)styrene, ar-chlorostyrene, ar-bromostyrene, ar,ar-dichlorostyrene, diisopropenylbenzene, vinyl isopropenylbenzene and other monovinylidene carbocyclic aromatic monomers; ethylene, propylene, isobutylene and other α-monoolefins; diallyl maleate, diallylphthalate, triallylmellitate, ethyl acrylate, methyl methacrylate, isopropyl methacrylate, dimethyl itaconate, ethylene glycol dimethacrylate, diethylene glycol acrylate, and other unsaturated esters; fumaronitrile, acrylonitrile, methacrylonitrile, acrylamide, methacrylamide, N-t-butyl methacrylamide and triallyl phosphate.

The curable compositions optionally contain other known additives, e.g., magnesium oxide, chalk, clay, sand, antimony oxide, alumina trihydrate, silica, slate powder, dolomite, barite, talc, zinc stearate, dyestuffs, fabrics and fibers of glass, synthetic resin, asbestos or textile products, compounds which give protection against light, heat or burning and the like.

Methods for curing conventional compositions containing unsaturated polyester, styrene monomer and catalyst are suitable for curing the curable compositions of this invention. As an additional advantage of the present invention, the curable compositions thereof are rapidly gelled and cured in match-die molding of parts having large flat dimension and thickness. Curable compositions of the present invention can be cured at low or even contact pressure; and as a result, faster, more efficient mechanical presses can be substituted for the slower hydraulic presses used in conventional match-die molding apparatus. As a general rule cure of the curable compositions of this invention can be effected at mold or bath temperatures less than 300° F. and in times of 10 minutes or less.

The following examples are given to illustrate the invention and should not be construed as limiting its scope. In the examples all parts and percentages are by weight unless otherwise indicated.

EXAMPLE 1

A 1-liter jacketed continuous chlorination reactor equipped with stirrer, gas inlet tube, thermometer and feed inelt port is charged with 975 g of ar-(t-butyl)ethylbenzene (~95% para-isomer) and 21 g of anhydrous tin tetrachloride. Chlorine gas is fed at 400 cc/min into the apparatus maintained at 25°-50° C. throughout the reaction. After 4.5 hours reaction time, more of the ar-(t-butyl)ethylbenzene is fed into the reactor at 328 cc/hr for 4 additional hours. Product is removed from the reactor, washed with 2% potassium hydroxide solution, and distilled to obtain ar-chloro-ar-(t-butyl)ethylbenzene (a mixture of 90 parts 2-chloro-4-(t-butyl)ethylbenzene, 5 parts 2-chloro-5-(t-butyl)ethylbenzene and 5 parts other isomers in 90% yield based on unrecovered starting material).

A 600-g portion of the ar-chloro-ar-(t-butyl)ethylbenzene and 5 g of cobalt naphthenate solution (6% Cobalt) are charged to a 1-liter, round-bottom, 3-necked flask equipped with a glass frit gas inlet tub, heating mantle, esterification water separator and a temperature controller. The reaction mixture is heated to 125° C. and oxygen is introduced at ~1.5 ft³/hour for a total of 8 hours. The oxygen is shut off and the product is analyzed by infrared spectroscopy and vapor phase chromatography and found to contain 20.4 percent of ar-chloro-ar-(t-butyl)acetophenone and 12 percent of ar-chloro-ar-(t-butyl)α-methyl benzyl alcohol, with the remaining material being starting material. The product is distilled under vacuum to obtain an alcohol-ketone mixture in 79% yield based on the unrecovered starting material. The mixture has an atmospheric boiling point of 300°-320° C.

A 100-g portion of the alcohol-ketone mixture, 10 g of calcium hydroxide and 5 g of copper chromite are placed in a 500 cc hydrogenation bomb. The bomb is heated at 150° C. for ½ hour under nitrogen and is then closed and purged three times with hydrogen. The pressure of the bomb is brought to 500 psig with hydrogen and is heated at 150° C. for four hours with moderate agitation. The bomb is cooled to room temperature and hydrogen is vented. Analysis of the product with vapor phase chromatography confirms ~90 percent ar-chloro-ar-(t-butyl)-α-methylbenzyl alcohol.

A mixture of 50 g of ar-chloro-ar-(t-butyl)-α-methylbenzyl alcohol and 50 parts of toluene is prepared. A reaction column (1" outside diameter×27" length) is filled to a bed height of 8 inches with silica gel (8–10 mesh, 340 m² of surface area/g, 140 Å average pore diameter) and sufficient amount of silicon carbide (6 mesh) is added to the tube to increase total bed height to 16 inches. The reaction column is heated to 350° C. Water preheatd to 300° C. and the mixture are added simultaneously into the silicon carbide end of the column at rates of 90 ml/hr and 45 ml/hr respectively. An intimate admixture of steam and the alcohol mixture in vapor phase is formed and passed downward through the silicon carbide preheated to 350° C. which acts as a preheat section for the vapor and then through the silica get to effect dehydration. Following passage through the silica gel, water and organic product are condensed in the column, and collected. The dehydrated organic product is decanted, dried and distilled. The distilled product is determined by vapor phase chromatography to be ar-chloro-ar-(t-butyl)styrene (a mixture of 92 pts 2-chloro-4-(t-butyl)styrene, 5 pts 2-chloro-5-(t-butyl)styrene and 3 pts other isomers) at 99 percent or greater purity. Overall yield on basis of amount of starting alcohol is greater than 90 percent.

A 100-g portion of the ar-chloro-ar-(t-butyl)styrene, hereinafter referred to as CTBS, is charged to a polymerization zone and contacted with 0.2 g of t-butyl peroctoate at 85° C. for 48 hours to provide a CTBS homopolymer having a Vicat softening point (ASTM D-1525-65T) at 163° C., a molecular weight of ~105,000, and viscosity of 9.11 cps (10% solution in tolune at 25° C.).

A monomer mixture of 34.9 g of fumaronitrile and 65.1 g of the CTBS is placed in a glass tub (½" dia×36" length). The tube is held under a vacuum for 5 minutes and then sealed with a flame. The tube is placed horizontally in a steam bath for three days. The polymer is removed from the glass tube, crushed and devolatilized in a vacuum oven at 140° C. and 24 hours. Analysis of the polymer yields 5.5% nitrogen and 15% chlorine confirming a fumaronitrile/CTBS (31.5/68.5) copolymer. The copolymer has a Vicat softening point of 176°-180° C.

EXAMPLE 2

In a manner similar to Example 1 ar-bromo-ar-(t-butyl)styrene is prepared by brominating ar-(t-butyl)ethylbenzene (a mixture of 95 pts of para-isomer and 5 pts of meta-isomer). Accordingly, a 5-liter, 3-necked round bottom flask equipped with stirrer, condenser, and addition funnel is charged with 2000 g of the ar-(t-butyl)ethylbenzene and 50 g of anhydrous tin tetrachloride. A 960-g portion of bromine is added dropwise to the flask (covered with aluminum foil) with stirring at 25°-35° C. over a 5-hour period. The reaction mixture is then stirred at 40° C. for 1 and ½ hours to complete the reaction and the reaction product is poured onto ice and washed once with water and once with a 10 percent aqueous solution of sodium carbonate.

The washed product is distilled under reduced pressure to obtain ar-bromo-ar-(t-butyl)ethylbenzene (a mixture of 95 pts of 2-bromo-4-(t-butyl)ethylbenzene and 5 pts of 2-bromo-5-(t-butyl)ethylbenzene).

A 1000-g portion of the 2-bromo-ar-t-butyl ethylbenzene is passed over a bed of alumina and then oxidized at 125° C. in an apparatus similar to the oxidation apparatus of Example 1 using 940 cc/min of oxygen and 10 g of cobalt naphthenate solution (6% cobalt). The reaction is stopped after 3½ hours at ~27% conversion. The product is washed with dilute sodium hydroxide, is then washed with water and is distilled under reduced pressure (B.P. 109° C. at 0.6 mm Hg).

The resulting 2-bromo-ar-(t-butyl)acetophenone is reduced at room temperature in diethyl ether using lithium aluminum hydride as the reducing agent in accordance with the teaching of Vogel, A.I., A textbook of *Practical Organic Chemistry*, 3rd ed., Longmans, Green & Co., New York, pp. 877-879 (1956). A pale crystalline solid of 2-bromo-ar-(t-butyl)a-methylbenzyl alcohol is obtained.

The resulting alcohol is dehydrated in accordance with the dehydration procedure of Example 1 to produce 2-bromo-ar-(t-butyl)styrene {95 pts 2-bromo-4-(t-butyl)styrene and 5 pts of 2-bromo-5-(t-butyl)styrene} containing about 2% of the starting alcohol. The 2-bromo-ar-(t-butyl)styrene boils at 77.5°-80° C. at 0.7 mm Hg and has a refractive index of 1.5598 at 25° C.

The ar-bromo-ar-(t-butyl)styrene, hereinafter referred to as BTBS, is polymerized in a glass bomb at 100° C. to provide a BTBS homopolymer which is a self-extinguishing, colorless solid soluble in toluene and having a Vicat softening point of 172°-174° C.

A monomer mixture of 50 parts of ar-(t-butyl)styrene and 50 parts of the BTBS are added to a bottle containing 0.2 part of t-butyl peroctoate. The bottle is purged with nitrogen, is sealed and is then subjected to polymerization conditions of 80° C. for 72 hours to provide an ar-(t-butyl)styrene/BTBS copolymer (approximately equimolar). The polymer is removed from the glass bottle, is crushed into a powder and is placed in a vacuum oven at 140° C. for 24 hours to remove unreacted monomer. The dried polymer is compression molded at 200° C. into articles which are resistant to boiling water and are fire retardant.

EXAMPLE 3

Curable compositions of CTBS and BTBS provided in Examples 1 and 2, respectively, are prepared by dissolving two 50-pt portions of dipropylene glycol maleate polymer (10 molecules of maleic acid/11 molecules of dipropylene glycol, acid number of 50) in separate 50-pt portions of CTBS and BTBS. A 0.5-part portion of t-butyl peroctoate is added to each of the two foregoing solutions and 10 g of each of the two resulting mixtures are added to glass test tubes (18 mm dia×150 mm length). A thermocouple and stopper is inserted into each test tube and the tubes are immersed in a heating bath at 240° F. and clamped. The gel time, cure time and maximum temperature of each of the two curable compositions are measured and recorded in Table I.

Several control compositions (C₁, C₂ and C₃) are similarly prepared using styrene, ar-chlorostyrene, and ar-(t-butyl)styrene instead of CTBS or BTBS and are cured by the foregoing procedure. Gel times, cure times and maximum temperatures of the control compositions are also measured and recorded in Table I.

TABLE I

| Run No. (1) | Monomer (2) | Gel Time, Sec (3) | Peak Cure Temp, °F. (4) | Cure Time, Sec (5) | Observation |
| --- | --- | --- | --- | --- | --- |
| 1 | CTBS | 4.4 | 424 | 29 | Lightly cracked, some pieces exceeding 1" × 3¼", transparent |
| 2 | BTBS | 5.0 | 396 | 37 | Lightly cracked, some pieces exceeding 1" × ¼", transparent |

TABLE I-continued

| Run No. (1) | Monomer (2) | Gel Time, Sec (3) | Peak Cure Temp, °F. (4) | Cure Time, Sec (5) | Observation |
|---|---|---|---|---|---|
| C$_1$* | Sty | 28.0 | 565 | 72 | Heavily cracked, no piece greater than ¼" in any dimension, opaque |
| C$_2$* | CS | 12.5 | 468 | 51 | Heavily cracked no piece greater than ¼" in any dimension, opaque |
| C$_3$* | TBS | 11.5 | 475 | 61 | Medium cracking, largest pieces about ½" × 1". |

*Not an example of the invention
(1) Average of six runs.
(2) CTBS - ar-chloro-ar-(t-butyl)styrene of Example 1
BTBS - ar-bromo-ar-(t-butyl)styrene of Example 2
Sty - styrene
CS - ar-chlorostyrene
TBS - ar-(t-butyl)styrene
(3) Gel time is determined using SPI Gel Test developed by the Standards Committee of the Reinforced Plastics Division of the Society of the Plastics Industry. See Lawrence, J.R., Polyester Resins, Reinhold Publishing Corp., New York, pp. 37-38 (1960).
(4) Maximum temperature reached using SPI Gel Test.
(5) Time interval between curable composition at 150° F. and maximum temperature using SPI Gel Test.

EXAMPLE 4

A polymerizable composition is prepared by adding 66 g of an isomeric mixture containing 2-chloro-5-(t-butyl)styrene and associated isomers to 34 g of maleic anhydride in 400 g of methyl ethyl ketone. The isomeric mixture is prepared by first chlorinating 5-(t-butyl)ethylbenzene in accordance with the procedure set forth in Example 1 and subsequently oxidizing, hydrogenating and dehydrating the chlorinated material in accordance with the procedures of Example 1. The composition is placed in a bottle which has been purged with nitrogen and is capped. The bottle is then heated in a water bath at 80° C. and is tumbled for 48 hours. The resulting heavy syrup in the bottle is diluted to 5% solids with methyl ethyl ketone and is added dropwise to a cold methanol with stirring. The resulting polymer precipitate is weighed and dried in a circulating air oven. The polymer gives a positive test for chlorine and is soluble in hot caustic confirming an ar-chloro-5-(t-butyl)styrene/maleic anhydride copolymer. The copolymer is cast into a thin film which does not distort at 200° C.

EXAMPLE 5

A mixture of 85 g of 2-bromo-4-(t-butyl)styrene is added to 20 g of acrylonitrile in a sample bottle. The sample bottle is placed on a balance in a fume hood and purged with nitrogen until the net weight is 100. The liquid monomer mixture is then poured into ½"×3" glass ampoules until ½ full and sealed under vacuum. The tubes are then placed in a glycol bath maintained at 110° C. After 48 hrs the tubes are placed in a circulating air oven at 140° C. for 24 hours. The tubes are removed and the glass shells are broken free of the polymer. The polymer is dissolved in methyl ethyl ketone and added dropwise to stirred methanol. The polymer precipitate is filtered and dried in a circulating air oven. Analysis of the polymer for bromine and nitrogen confirms a 2-bromo-4-(t-butyl)styrene/acrylonitrile copolymer. The copolymer is cast as a film which is found to be heat and fire resistant.

EXAMPLE 6

A polymerizable composition of 70 parts of an isomeric mixture containing 2,3-dichloro-5-(t-butyl)styrene and associated isomers and 30 parts of methylmethacrylate are placed in a glass tube (½" dia×24" length) with 0.1 part of α,α'-azodiisobutyronitrile and the tube is sealed. The isomeric mixture is prepared by chlorinating 3-(t-butyl)ethylbenzene in accordance with Example 1 to form monochlorinated material which is isolated by distillation and subjecting the monochlorinated to the same chlorinating conditions to form the dichlorinated material which is subsequently oxidized, hydrogenated and dehydrated by the procedures of Example 1. The polymerizable composition is polymerized for 48 hours at 40° C. The sealed tube is then placed in a glycol bath at 90° C. for an additional 24 hrs. The polymer, after removal from the tube, is dissolved in methyl ethyl ketone to form a 5% solution of the polymer. The 5% solution is added dropwise to methanol with stirring. The precipitated polymer is dried in an air oven and is then injection molded into a lens shape. The polymer lens does not distort in boiling water.

EXAMPLE 7

The 2-bromo-4-(t-butyl)-α-methylstyrene is prepared by first brominating 4-(t-butyl)ethylbenzene under the conditions set forth in Example 2 and subsequently oxidizing the brominated material as in Example 2 to form the corresponding acetophenone, reacting the acetophenone with methyl magnesium bromide under the conditions described in Vogel, A. I., *Practical Organic Chemistry*, 813 (1956) and dehydrating the resulting alcohol by the procedure of Example 2. A 10-g portion of 2-bromo-4-(t-butyl)-α-methylstyrene is dissolved in 85 g of methylene chloride. This mixture is charged to a flask equipped with stirrer which flask is placed in a dry ice-acetone bath until cooled to about −50° C. Rapid stirring is continued as 0.1 g of conc. sulfuric acid (95%) is added in one shot. The mixture is stirred an additional hour at −50° C. and then poured into methanol. The polymer precipitate is filtered, washed with methanol and dried in air. Analysis of the polymer confirms a homopolymer of 2-bromo-4-(t-butyl)l-α-methylstyrene.

EXAMPLE 8

2-Bromo-5-(t-butyl)styrene is prepared by first brominating 3-(t-butyl)ethylbenzene under conditions used in Example 2 and then oxidizing, hydrogenating, and dehydrating the brominated material as in Example 2. The 2-bromo-5-(t-butyl)styrene is then isolated from the other isomers produced and a 77-g portion thereof is mixed with 23 g of styrene. The resulting mixture is polymerized as in Example 6. The polymer is compression molded at 200° C. into hard, clear slabs. Analysis of the polymer confirms a styrene/2-bromo-5-(t-butyl)styrene (29.3/70.7) copolymer.

EXAMPLE 9

An isomeric mixture containing 2-chloro-4-(t-pentyl)styrene is prepared in accordance with Example 1 except that 4-(t-pentyl)ethylbenzene is chlorinated instead of ar-(t-butyl)ethylbenzene.

A polymerizable composition of 75 g of butadiene and 25 g of the isomeric mixture of 2-chloro-4-(t-pentyl)styrene and associated ar-chloro-4-(t-pentyl)styrene is emulsified in 180 g of water, containing 5 g of sodium stearate. A 0.3 g portion of potassium persulfate is added as a catalyst, 0.5 g of dodecylmercaptan is added as a chain terminating agent and 0.3 g of potassium bicarbonate is added as a buffer. The emulsion is transferred to a bottle which is purged with nitrogen, is capped and is placed in a rotating tumbler bath at 50° C. for 12 hours. The unreacted monomers are stripped off, and the resulting latex is cast as a thin layer on a glass plate. The layer of latex is dried to a continuous film which is stripped from the glass plate. The film exhibits elasticity and other properties similar to those of rubber. Analysis of the polymer confirms a butadiene/ar-chloro-4-(t-pentyl)styrene copolymer (~65/35).

EXAMPLE 10

A mixture of 50 g of hydroxyapatite and 0.12 g of sodium dodecylbenzene sulfonate is added to 4000 g of water and the resulting aqueous mixture is shaken until uniform and filtered into a stock bottle. A 100-g portion of this suspending media and a small crystal of sodium dichromate are added to a citrate bottle which is then shaken. A monomer mixture of 30 g of 2-chloro-4-(t-octyl)styrene prepared in accordance with Example 1 except that 4-(t-octyl)ethylbenzene is chlorinated instead of ar-(t-butyl)ethylbenzene and 30 g of ar-chlorostyrene containing 0.12 g of t-butylperoctoate and 0.03 g of t-butylperbenzoate is added to the water layer. The citrate bottle is purged with nitrogen and capped. The bottle is then shaken vigorously and the monomeric mixture is polymerized in a tumbling glycol bath at 90° C. for 8 hours and then at 110° C. for 8 additional hours. The resulting polymer beads are collected on a filter and washed with quantities of dilute (0.05 N) hydrochloric acid and then with water. The beads are then dried and form a film when heat plastified in the platens of a molding press. This film does not distort in boiling water.

EXAMPLE 11

A mixture of 10 parts of 2-bromo-4-(t-butyl)styrene and 10 parts of isobutylene are cooled and collected in 100 parts of liquid propane at −50° C. A 1-ml portion of boron trifluoride etherate solution (5% active) is added to the mixture. The monomers are polymerized at −40° C. The resulting polymer solution is added slowly to methanol and warmed to room temperature. The polymer formed is pliable, soluble in hydrocarbon solvents such as toluene and forms a film when dry. Analysis of the polymer confirms an isobutylene/2-bromo-4-(t-butyl)styrene copolymer.

EXAMPLE 12

To a flask containing 300 g of a large particle size polybutadiene latex[1] (approximately 150 g of solid rubber) is added with stirring a mixture of 1.2 g of potassium persulfate, 5.0 g of t-dodecylmercaptan, 5.0 g of di-t-butyl-p-cresol, and 10 g of sodium octadecylsulfosuccinate, 5 g of a solution of tetrasodium ethylene diamine tetraacetate and 5 g of stearic acid. A monomeric material consisting of 200 g of acrylonitrile, 250 g of 2-chloro-4-(t-butyl)styrene and 250 g of styrene is added continuously dropwise to the heated (60° C.), stirred latex composition over a period of 6 hours. The resulting mixture is stirred for an additional hour at 80° C. The resulting polymerizate is then filtered through a filter to remove a small amount of coagulum around the stirrer. The polymerizate is then poured thru a 12 mm×600 mm bed of polymer particles described in U.S. Pat. No. 3,520,806 to remove any residual monomer. The polymerizate is then dried in a tray and then subjected to conditions of devolatilization in a heated vacuum oven. The polymerizate in the form of a cake is then crushed to a powder. A portion of this powder is compacted on a two roll mill heated to 180° C. and then molded in a compression press (170° C.) to ⅛" thick dumbbell bars which are tested for impact strength. The bars have notched impact strength as determined by ASTM D-256-47T of 3.4 ft-lbs/in and heat resistance greater than 250° F. under load. Test bars of conventional acrylonitrile/butadiene/styrene terpolymer are severely deformed when subjected to a temperature of 220° F. under load. A 100-g portion of the powder is intimately mixed in a twin shell blender with 100 g of a vinyl chloride/vinylidene chloride (99/1) copolymer that has been previously stabilized with 3 weight percent of dibutyl tin S,S′-bis(3,5,5-trimethylhexylmercapto)acetate. The resulting powder mix is then heat plastified using heated rolls, to obtain a compacted form which is suitable for molding. A similar amount of the powder mix is fed directly to a screw injection molding machine and molded into tabs.

[1]High viscosity polybutadiene latex having 97 percent of polymerized butadiene and 3 percent of polymerized styrene and divinyl benzene, 60–62 percent polymer solids, a pH of 10–10.5 and particle size of 1,000 Å to 1 μ (ave = ~6000 Å). The polybutadiene is composed of the following structures:
12% cis 1,4-polybutadiene
74% trans 1,4-polybutadiene
11% vinyl 1,2-polybutadiene
3% polymerized styrene and divinyl benzene.

EXAMPLE 13

A 30-part portion of a liquid hydrocarbon polymer having a viscosity in the range of 4000–4500 poise at 77° F., a composition of about 20% styrene and 80% butadiene with most of the butadiene being 1,2-polymer having pendant vinyl groups, specific gravity 0.915 and a refractive index 1.53 is added to 70 parts of ar-chloro-5-(t-butyl)styrene [a mixture of 90 parts of 2-chloro-5-(t-butyl)styrene and 10 parts of 3-chloro-5-(t-butyl)styrene]. Then a mixture of 5 parts of 50% divinylbenzene in ethylvinylbenzene and 4 parts of di-t-butylperoxide are added to the polymerizable material. The resulting resin mix is then cast between plates with a 1/16" spacer and cured to a crosslinked polymer at 150° C. in a pressure press. The plastic formed is clear, hard, insoluble in most solvents and heat resistant. A similar portion of the resin mix is poured between and over 13 plies of fiberglass cloth (#181 weave) and cured in a press with ⅛" spacers at 150° C. After curing, the laminate is sawed into dumbbell shaped bars for testing. The resulting laminates have tensile strength above 45,000 psi, notched impact strength of 17.4 ft-lbs, and outstanding heat resistance (Vicat softening point at 160° C.).

EXAMPLE 14

A 30-part portion of a liquid hydrocarbon polymer of polymerized butadiene greater than 80 percent of 1,2-polymer in a hexane solution (50% polymer in hexane) is added to 70 parts of an isomer containing 2-bromo-5-(t-hexyl)styrene and associated ar-bromo-5-(t-hexyl)styrene isomers. The isomer mixture is prepared in accordance with Example 2 except that 5-(t-hexyl)ethylbenzene is brominated instead of ar-(t-butyl)ethylbenzene. This mixture is heated to no more than 40° C. under vacuum to remove the hexane. Three parts of di-cumyl peroxide is added to the mix and dissolved. This resin mix is divided into two portions. One portion is crosslinked as in Example 13 and the other portion is poured to fiberglass cloth and then cured also as in Example 13. Both the crosslinked polymer and the laminate are fire retardant in addition to being clear, hard, insoluble in most solvents and heat resistant.

EXAMPLE 15

A 10-part portion of a polybutadiene-type rubber made by anionic polymerization using a lithium catalyst is added to a mixture of 5 parts of divinylbenzene and 42.5 parts of ar-chloro-4-(t-heptyl)styrene prepared by first chlorinating 4-(t-heptyl)ethylbenzene and then following the remaining procedures of Example 1 and 42.5 parts of ar-bromo-4-(t-hexyl)styrene prepared by first brominating 4-(t-hexyl)ethylbenzene and then following the remaining procedures of Example 2. A 2-part portion of di-t-butyl peroxide is added to the resulting resin syrup which is then divided into two portions. One portion is crosslinked as in Example 13 and the other portion as before on fiberglass cloth and cured also as in Example 13. The curable composition and the laminate cure very rapidly and exhibit heat resistance and fire retardancy.

EXAMPLE 16

A 50-part portion of a copolymer of about 75 weight percent of 2-bromo-4-(t-butyl)styrene and about 25 weight percent of acrylonitrile is heat plasticized with 50 parts of polyvinyl chloride, containing 3 weight percent of a commercially available sulfur containing organotin compound as stabilizer, by milling the materials on a pair of laboratory rolls at a temperature of about 180° C. for a period of about 20 minutes to form a homogeneous composition. The mixture is then removed from the rolls, is allowed to cool to room temperature and is crushed to a granular form. Portions of the compositions are injection molded and tested for tensile strength, elongation and impact strength. The resulting injection molded articles are found to have excellent tensile strength, elongation and impact strength as compared to compositions described in U.S. Pat. No. 3,424,823.

EXAMPLE 17

A solution is prepared by dissolving in 74 parts of 2-chloro-4-(t-butyl)styrene, 10 parts of stereospecific polybutadiene rubber having a Mooney number ML 1+4 (212° F.) of 35, i.e., Firestone Synthetic Rubber and Latex Company, "Diene", consisting of over 90 percent 1,4-structure and only about 7.5 percent vinyl structure (1,2-structure), the cis-1,4 configuration comprising 32 to 35 percent of the polymer, and which polybutadiene rubber is of narrow molecular weight distribution. A 16-part portion of acrylonitrile is added to the solution. The solution is heated in a closed elongated vessel and is agitated by rotating the vessel end over end to polymerize the monomer under time and temperature conditions as follows: 3 days at 95° C.; 3 days at 115° C.; and 1 day at 140° C. The polymer is removed from the containers and is ground to a granular form. The ground polymer is heated in a vacuum oven at 150°–160° C. under 1.5 millimeters absolute pressure for a period of 16 hours to remove volatile ingredients, then is cooled and crushed to a granular form. Portions of the product are injection molded and tested for tensile strength, elongation and impact strength. The resulting test pieces have excellent tensile and impact strength and elongation as compared to those described in U.S. Pat. No. 3,426,103.

In accordance with the foregoing procedures, several similar compositions are prepared using poly-isoprene (cis-1,4) rubber, styrene-butadiene block copolymer rubber, butadiene/acrylonitrile rubber, ethylene/propylene rubber, and natural rubber instead of the stereospecific polybutadiene rubber as the rubber component. Injection moldings of the resulting compositions also exhibit excellent tensile strength, elongation and impact strength.

What is claimed is:

1. An ar-halo-ar-(t-alkyl)styrene wherein halo is chloro, bromo or fluoro and tertiary alkyl has from 4 to 8 carbon atoms and is in a ring position para or meta to the ethylenically unsaturated group of the ar-halo-ar-(t-alkyl)styrene.

2. A polymerizable ar-halo-ar-(t-alkyl)styrene represented by the general structural formula:

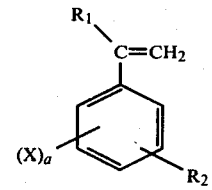

wherein $R_1$ is hydrogen; $R_2$ is alkyl having from 4 to 8 carbon atoms and is in a ring position para or meta to

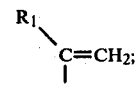

X is chloro or bromo and is in an open ring position; and a is one or two.

3. The styrene of claim 2 wherein the ar-halo-ar-alkylstyrene is represented by one of the following structural formulas:

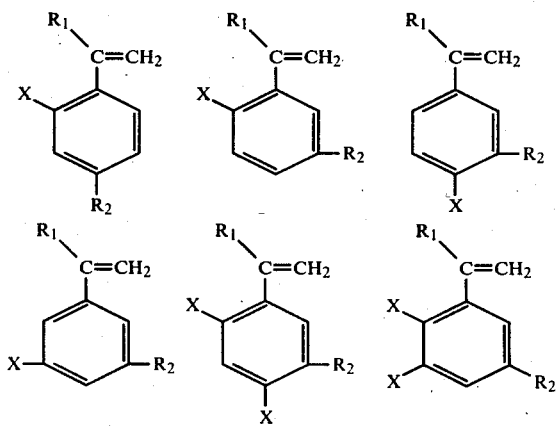

wherein $R_1$ is hydrogen; $R_2$ is t-butyl, t-pentyl, t-hexyl, t-heptyl or t-octyl; and X is chloro or bromo.

4. The styrene of claim 2 wherein the ar-halo-ar-(t-alkyl)styrene is a 2-halo-4-(t-alkyl)styrene or 2-halo-5-(t-alkyl)styrene.

5. The styrene of claim 2 wherein the ar-halo-ar-alkylstyrene is selected from the group consisting of 2-bromo-4-(t-butyl)styrene, 2-chloro-4-(t-butyl)styrene, 2-bromo-5-(t-butyl)styrene, 2-chloro-5-(t-butyl)styrene.

6. The styrene of claim 2 which is an isomeric mixture of ar-halo-ar-(t-alkyl)styrenes.

7. The styrene of claim 2 which is an isomeric mixture of 2-bromo-4-(t-butyl)styrene and 2-bromo-5-(t-butyl)styrene or copolymer of 2-chloro-4-(t-butyl)styrene and 2-chloro-5-(t-butyl)styrene.

8. A curable composition comprising from about 10 to about 70 weight percent of an unsaturated polyester, from about 90 to about 30 weight percent of the polymerizable ar-halo-ar-(t-alkyl)styrene of claim 1 and a catalytic amount of a free-radical generating catalyst; said percentages being based on the total weight of the polyester and the ar-halo-ar-(t-alkyl)styrene, said polyester being the condensation reaction product of an unsaturated polycarboxylic acid with a polyhydric alcohol.

9. A curable composition comprising from about 10 to about 70 weight percent of an elastomeric polymer of conjugated aliphatic diene and from about 90 to about 30 weight percent of the polymerizable ar-halo-ar-alkylstyrene of claim 1.

* * * * *